United States Patent
Winn et al.

(10) Patent No.: US 9,135,732 B2
(45) Date of Patent: Sep. 15, 2015

(54) OBJECT-LEVEL IMAGE EDITING

(75) Inventors: John Winn, Cambridge (GB); Carsten Rother, Cambridge (GB)

(73) Assignee: Microsoft Corporation, Redmond, WA (US)

(*) Notice: Subject to any disclaimer, the term of this patent is extended or adjusted under 35 U.S.C. 154(b) by 820 days.

(21) Appl. No.: 12/280,892

(22) PCT Filed: Feb. 8, 2007

(86) PCT No.: PCT/US2007/003529
§ 371 (c)(1),
(2), (4) Date: Aug. 27, 2008

(87) PCT Pub. No.: WO2007/100470
PCT Pub. Date: Sep. 7, 2007

(65) Prior Publication Data
US 2009/0096808 A1   Apr. 16, 2009

(30) Foreign Application Priority Data
Feb. 28, 2006   (EP) .................................. 06270024

(51) Int. Cl.
*G06T 11/60*   (2006.01)
(52) U.S. Cl.
CPC ....................... *G06T 11/60* (2013.01)
(58) Field of Classification Search
CPC ... G06F 3/0484; G06F 3/04842; G06F 17/24; G06F 9/465; G06T 11/60
USPC .......... 345/619, 594; 358/452, 453, 540, 537; 715/713
See application file for complete search history.

(56) References Cited

U.S. PATENT DOCUMENTS

| | | | |
|---|---|---|---|
| 5,420,966 A | 5/1995 | Silverbrook |
| 5,469,536 A | 11/1995 | Blank |
| 5,596,693 A | 1/1997 | Needle et al. |
| 5,870,100 A | 2/1999 | DeFreitas |

(Continued)

FOREIGN PATENT DOCUMENTS

EP   1748389   1/2007

OTHER PUBLICATIONS

Barrett, William et al., "Object-Based Image Editing", ACM Transactions on Graphics (TOG) archive, vol. 21, Issue 3, Jul. 2002, pp. 777-784.

(Continued)

*Primary Examiner* — Ke Xiao
*Assistant Examiner* — Kim-Thanh T Tran
(74) *Attorney, Agent, or Firm* — Steve Wight; Judy Yee; Micky Minhas

(57) ABSTRACT

Systems and methods for editing digital images using information about objects in those images are described. For example, the information about objects comprises depth ordering information and/or information about the class each object is a member of. Examples of classes include sky, building, aeroplane, grass and person. This object-level information is used to provide new and/or improved editing functions such as cut and paste, filling-in image regions using tiles or patchworks, digital tapestry, alpha matte generation, super resolution, auto cropping, auto color balance, object selection, depth of field manipulation, and object replacement. In addition improvements to user interfaces for image editing systems are described which use object-level information.

20 Claims, 18 Drawing Sheets

(56) References Cited

U.S. PATENT DOCUMENTS

| | | | |
|---|---|---|---|
| 5,872,867 A | | 2/1999 | Bergen |
| 6,069,713 A * | | 5/2000 | Kusama ............... 358/452 |
| 6,070,167 A * | | 5/2000 | Qian et al. ............... 1/1 |
| 6,404,426 B1 * | | 6/2002 | Weaver ............... 345/419 |
| 6,483,519 B1 | | 11/2002 | Long et al. |
| 6,593,933 B1 | | 7/2003 | Xu et al. |
| 6,762,769 B2 | | 7/2004 | Guo et al. |
| 7,835,577 B2 * | | 11/2010 | Grady ............... 382/173 |
| 7,873,909 B2 * | | 1/2011 | Evans ............... 715/764 |
| 2002/0131495 A1 | | 9/2002 | Prakash et al. |
| 2002/0136453 A1 | | 9/2002 | Aggarwal et al. |
| 2003/0210828 A1 | | 11/2003 | Georgiev et al. |
| 2004/0095357 A1 | | 5/2004 | Oh et al. |
| 2004/0155881 A1 | | 8/2004 | Kotani et al. |
| 2006/0053374 A1 * | | 3/2006 | Wilensky ............... 715/716 |

OTHER PUBLICATIONS

Oh, Byong Mok et al., "Image-Based Modeling and Photo Editing", Proceedings of the 28th annual conference on Computer graphics and interactive techniques, 2001, 10 pages.
Ballester et al, "A Variational Model for Filling-in Gray Level and Color Images", IEEE Jul. 2001, Proceedings 8th IEEE Intl Conf on Computer Vision, 7 pgs.
Bertalmio et al, "Image Inpainting", Computer Graphics, SIG Graph 2000, Jul. 2000, 8 pgs.
Bertalmio et al, "Navier-Stokes, Fluid Dynamics, and Image and Video Inpainting", Proc Conf Computer Vision Pattern Recognition, Dec. 2001, 8 pgs.
Bertalmio et al, "Simultaneous Structure and Texture Image Inpainting", Jun. 2003, Proceeds IEEE Computer Society Conf on Computer Vision and Pattern Recognition, 13 pgs.
Bertalmio et al, "Three Examples of Inpainting Using the Navier-Stokes Based Method", CVPR 2001, 2 pgs.
Efros et al, "Texture Synthesis by Non-Parametric Sampling", IEEE Intl Conf on Computer Vision, Sep. 1999, 6 pgs.
Freeman et al, "Example-Based Super-Resolution", Mar. and Apr. 2002, Computer Graphics and Applications, 10 pgs.
Rane et al, "Structure and Texture Filling-In of Missing Image Blocks in Wireless Transmission and Compression Applications", IEEE Transactions on Image Processing, vol. 12, No. 3, Mar. 2003, 8 pgs.
Rane et al, "Wavelet-Domain Reconstruction of Lost Blocks in Wireless Image Transmission and Packet-Switched Networks", Proc 2002 Intl Conf on Image Processing, Sep. 2002, 4 pgs.
Rother et al, "Digital Tapestry", Microsoft Research, Jan. 2005, Proc IEEE Computer Vision and Pattern Recognition, 8 pgs.
Verdera et al, "Inpainting Surface Holes", Proc 2003 Intl Conf on Image Processing, Sep. 2003, 4 pgs.
Wei et al, "Fast Texture Synthesis using Tree-Structured Vector Quantization", Proc SIGGRAPH 2000, Jul. 2000, 10 pgs.
Xu et al, "Chaos Mosaic: Fast and Memory Efficient Texture Synthesis", Apr. 2000, Microsoft Research, 32 pgs.
"Notice of Allowance Issued for European Patent Application No. 06270024.0", Mailed Date: Oct. 6, 2014, 9 pages.
Suh, et al., "Automatic Thumbnail Cropping and its Effectiveness", In Proceedings of the 16th Annual ACM Symposium on User Interface Software and Technology, vol. 5, Issue. 2, Nov. 2, 2003, pp. 95-104.

* cited by examiner

OBJECT-LEVEL IMAGE EDITING

RELATED APPLICATIONS

This application is a National Stage of International Application No. PCT/US2007/003529, filed 8 Feb. 2007, which claims priority from European Patent Application No. 06270024.0, filed on 28 Feb. 2006. Both applications are incorporated herein by reference.

TECHNICAL FIELD

This description relates generally to image editing; it is particularly related to, but in no way limited to, systems and methods for editing digital images using information about objects in those images.

BACKGROUND

Image processing tools such as Microsoft's Digital Image Suite (trade mark), Adobe Photoshop (trade mark) and Illustrator (trade mark) as well as Google Picasa (trade mark) are known. There is an increasing demand for such tools in both the domestic and professional markets. It is required to simplify the actions needed by the user in order to operate the image processing tools as well as to provide a tool that operates quickly and effectively. In addition it is required to provide increased functionality within the tools such that users can perform more types of operations on digital images as well as to improve existing functionality such that the results of operations are more realistic and aesthetically pleasing.

It is required to provide an improved system and method for image editing or image processing which overcomes or at least mitigates one or more of the problems mentioned herein.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Systems and methods for editing digital images using information about objects in those images are described. For example, the information about objects comprises depth ordering information and/or information about the class each object is a member of. Examples of classes include sky, building, aeroplane, grass and person. This object-level information is used to provide new and/or improved editing functions such as cut and paste, filling-in image regions using tiles or patchworks, digital tapestry, alpha matte generation, super resolution, auto cropping, auto colour balance, object selection, depth of field manipulation, and object replacement. In addition improvements to user interfaces for image editing systems are described which use object-level information.

The present example provides a method of editing a source digital image comprising the steps of:
  accessing automatically generated object-level information about the source digital image, that information comprising segmentation of the image into one or more objects and, for each of the objects, details of a class that the object is a member of; and
  automatically processing the source digital image on the basis of the object-level information to form an output digital image.

In another example a corresponding apparatus for editing a source digital image is provided comprising:
  an interface arranged to access automatically generated object-level information about the source digital image, that information comprising segmentation of the image into one or more objects and, for each of the objects, details of a class that the object is a member of; and
  a processor arranged to automatically process the source digital image on the basis of the object-level information to form an output digital image Preferably the object-level information comprises any of: information about depth ordering of at least some of the objects; object attributes; and information about the position of the object parts.

In some examples the method further comprises combining at least part of the source digital image with one or more reference digital images to form the output digital image and wherein the method comprises accessing automatically generated object-level information about the reference digital images, that information comprising segmentation of the reference images into one or more objects and, for each of the objects, details of a class that the object is a member of.

In some examples, the method is carried out for a plurality of source digital images to create a single output image and the output image is formed automatically on the basis of object-level information about each of the source images. For example, in digital tapestry, photo-montage or other image blending techniques. Preferably those methods comprise selecting parts of the source images for inclusion in the output image on the basis of the object-level information. For example, selecting locations in the output image to position parts of the source images on the basis of the object-level information.

In other examples the source image is of a low resolution compared with the output image. For example, the step of processing the source image comprises accessing a database of images, having higher resolution than the source image, and selecting images from that database to use in forming the output image, on the basis of the object-level information.

In some embodiments the output image is cropped from the source image and the step of processing the source image comprises automatically cropping the source image on the basis of the object level information. Preferably the method further comprises automatically cropping the source image on the basis of a template, rule or criteria selected from a plurality of specified templates rules of criteria. In some examples the step of processing the source image comprises adjusting the colour balance of that source image on the basis of the object-level information.

Preferably said step of processing the source image comprises receiving only a single user input for selecting an object in the source image and presenting an indication to a user via a user interface as to which object in the source image is selected as a result of that single user input, the selection having been made by the user with a single action.

Preferably the method further comprises arranging the user interface such that editing options presented to a user via the interface are selected on the basis of the object-level information associated with the selected object.

In some examples the method further comprises modifying any of the colour, focus or depth order of the selected object.

Preferably said step of processing the source image comprises replacing an object or part of an object in the source image with an image of a selected object or object part from a database and wherein selection of the object or object part is made on the basis of the object-level information.

The apparatus described above may have any suitable features to perform the methods described above.

Another example provides a computer program comprising computer program code means adapted to perform all the steps of any of the methods when said program is run on a computer.

For example, the computer program is embodied on a computer readable medium.

The method may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilised. The description sets forth the functions of the example and the sequence of steps for constructing and operating the example. However, the same or equivalent functions and sequences may be accomplished by different examples.

Figure 1:
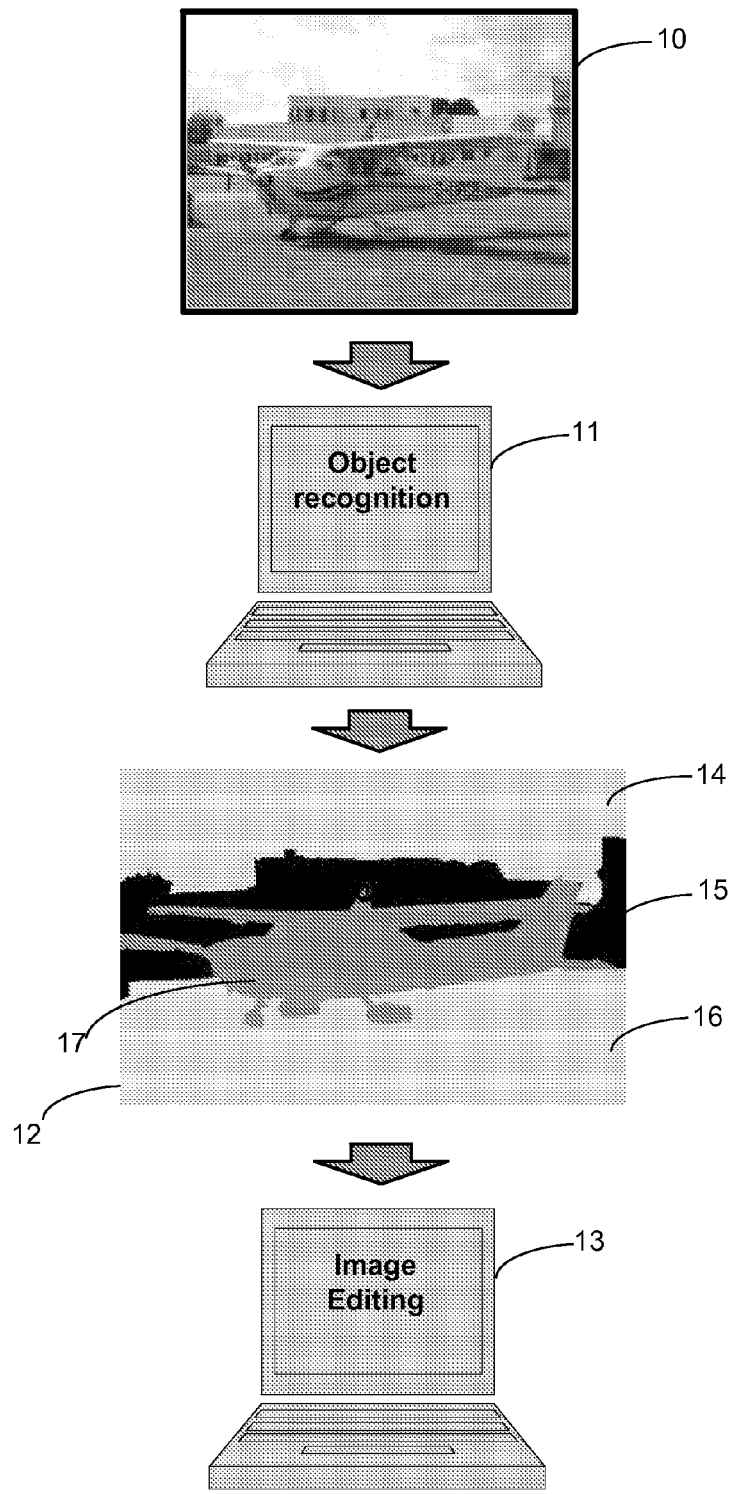
FIG. 1. is a schematic diagram of input to an object-level image editing system.

FIG. 1 is a schematic diagram showing inputs to an object-level image editing system. A source image 10 of any suitable type in digital form is provided to an object recognition system 11. The source image 10 in the present example shows a light aircraft standing on grass in front of a building. A cloudy sky is visible above the building. The object recognition system produces an analysis of the source image. The analysis results are represented in FIG. 1 as an image 12 although this is not essential. Any suitable form of representation can be used. The analysis of the source image comprises a segmentation of that source image into one or more objects. In the example shown the image is segmented into four main regions which are indicated by shaded regions in image 12 of FIG. 1. The object recognition system also labels each segmented region as being of a particular type of object class. In this example the four regions are identified as being of object classes sky 14, grass 16, building 15 and plane 17. The information produced by the object recognition system is referred to herein as object-level information and this is accessible to the image editing system 13 of the present invention together with the source image 10 itself.

Any suitable type of object recognition system 11 can be used which has the ability to segment a source image and identify appropriate object classes for segmented regions of the source image. At least a plurality of possible object classes is used to label the segmented image regions and in a preferred example, around 20 object classes it is possible to increase the scale of the system and use much higher numbers of object classes. Examples of object classes comprise sky, grass, person, building, horse, plane, cow, sheep, water, boat, tree, road and flower. In some embodiments the object recognition system 11 is preferably also able to provide depth ordering information for the identified objects although this is not essential. Also, the object recognition system is preferably, but not essentially, able to identify particular instances of objects (e.g. recognise an image of a person as being of a particular named individual) and to identify information about the object such as its orientation, object attributes, presence and position of object parts (e.g. person's face, leaves of a tree, roof of a building). The object recognition system may optionally comprise semantic information associated with the object classes such as information about the relative sizes of objects of class person and building or information about the general position of objects such as sky in images.

Figure 2:
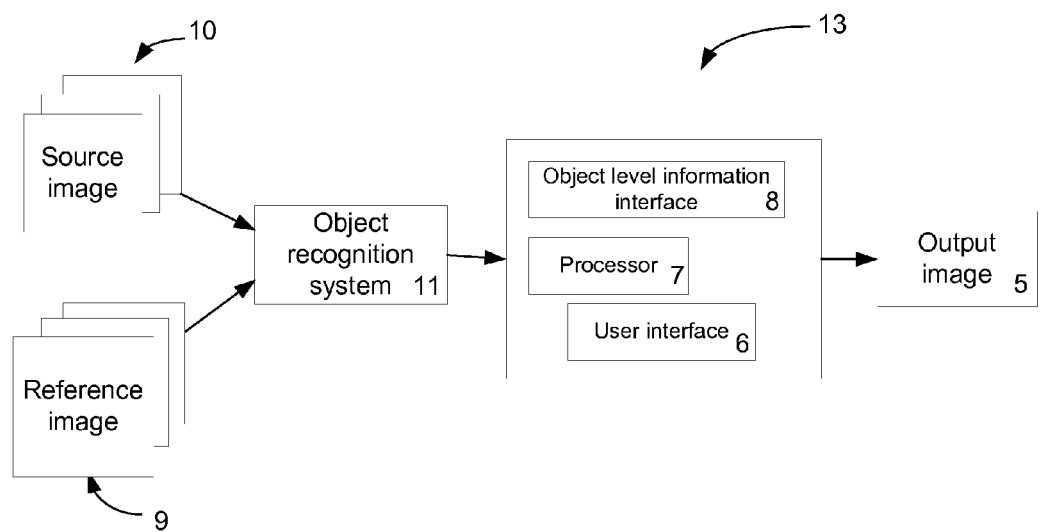
FIG. 2 is a schematic diagram of an object-level image editing system in more detail.

FIG. 2 is a schematic diagram of the object-level image editing system 13 of FIG. 1 in more detail. One or more source images 10 and optionally one or more reference images 9 are input to the object recognition system 11 discussed above. For example, the source image may comprise a photograph of a person against a walled background. The reference image may comprise a garden landscape. In the case that the image of the person is to be pasted onto the garden landscape the output image would comprise an image of the person against a garden landscape. The object recognition system is preferably used to analyse both the source images and reference images. The recognition results, in addition to the source 10 and reference images 9 are made available to the object-level image editing system 13. That system comprises an object-level information interface 8 which interfaces with the object recognition system 11 or accesses results of that object recognition system in any suitable manner. A processor 7 is also provided and optionally a user interface 6. The processor is of any suitable type such as a personal computer, an operating system, a dedicated processor or a distributed system. The object-level image editing system produces an output image 5 on the basis of the various inputs.

By using the object-level information provided by the object recognition system we are able to provide new ways of automatically editing images and to improve existing methods of automatically editing images. A high level summary of a method of editing an image is now given and then examples of particular methods are set out.

In any of the embodiments described herein it is also possible for a user to optionally modify or correct the object-level information prior to using that information for image editing. The user can make these modifications or corrections manually or in any other suitable manner.

Figure 3:
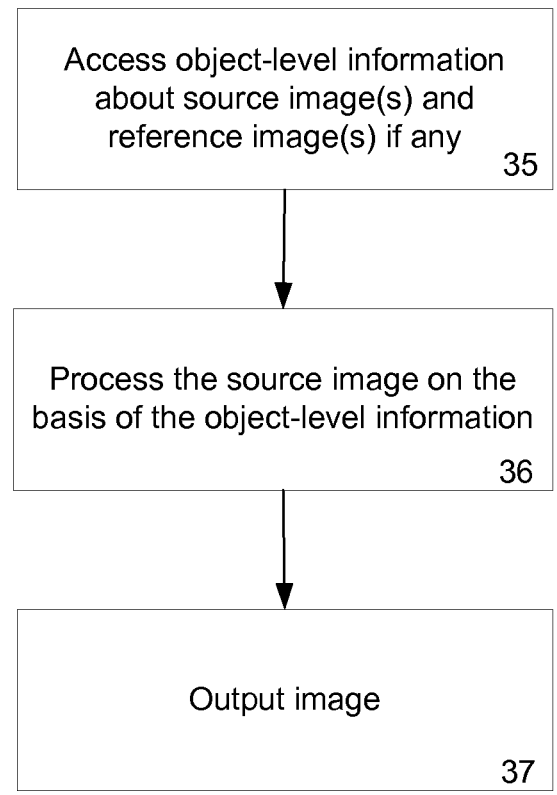
FIG. 3 is a high level flow diagram of a method of editing an image using an object-level image editing system.

FIG. 3 is a high level flow diagram of a method of editing an image using an object level image editing system. Object level information about one or more source images, and optionally one or more reference images is accessed (see box 35). This is done using the interface 8 of FIG. 2. The source image(s) and any reference image(s) are processed on the basis of the object level information (see box 36) and an output image formed (see box 37).

Examples of particular methods of editing images using object-level information are now given:
Smart Tiling In our earlier US patent application entitled "Image region filling by example-based tiling" published on 26 Aug. 2004 with publication number US2004-0165787A1, we describe using tiles of image data to perform various tasks including, but not limited to, repairing (e.g. hiding tears, scratches, stains, and other damage), correcting (e.g. removing red eyes and other undesirable features), and modifying (e.g. removing features of the image) a digital image. In many such activities, the task may be accomplished by "filling" a region in the image with other image data. In that earlier patent application we describe borrowing example tiles of image data from the proximity of a destination image region or some other source to generate new image data for filling in the region. The example-based filling system described identifies appropriate filling material to replace a destination region in an image and fills in the destination region using this material, thereby alleviating or minimising the amount of manual editing required to fill in a region in an image. Destination regions may be designated by user input (e.g. selection of an image region by a user) or by other means (e.g. specification of a colour or feature to be replaced).

In the present application we extend and build on that earlier work by enabling the selection of appropriate filling material to be guided using the object-level information. In addition, we enable the designation of destination regions to be automatically achieved, by using the object-level information. The term "tile" is used herein to refer to a region or patch of image data suitable for filling a destination region of a digital image. A tile can be represented by a group or grid of pixels or in any other suitable manner.

Figure 4:
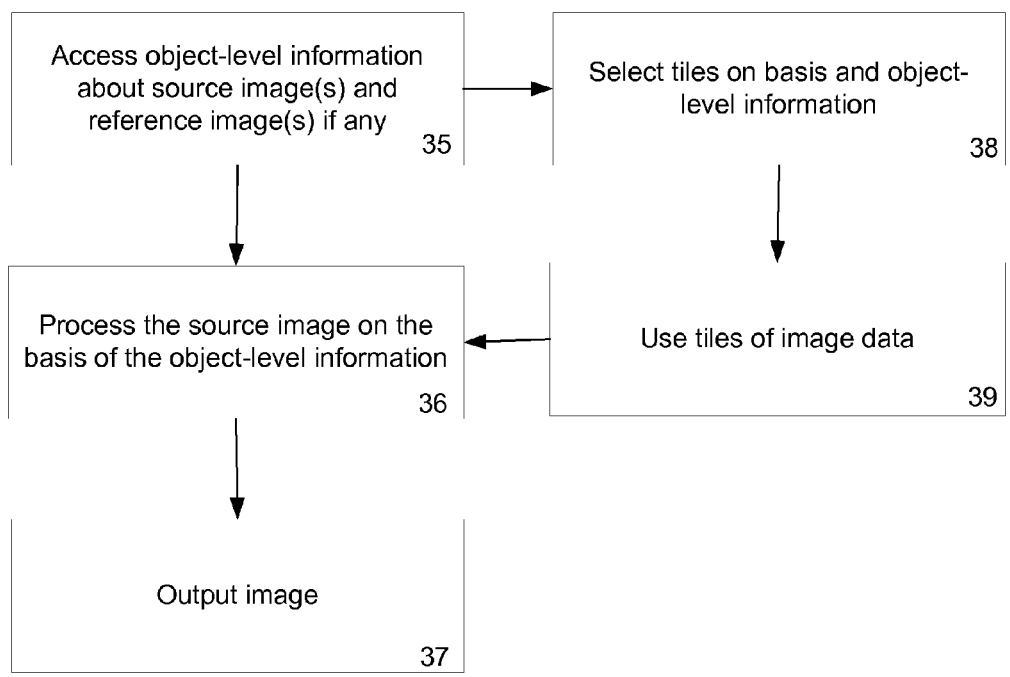
FIG. 4 is a flow diagram of a method of editing an image using tiling guided by object-level information.

FIG. 4 is a flow diagram of a method of using tiles in the object-level image editing system of the present application. This figure is the same as FIG. 3 except that tiles of image data are used in the processing stage (see box 39). For example, the tiles of image data are patches of pixels or grids of pixels. The tiles of image data can be used for example, to fill in regions of an image where an object has been deleted. Preferably the tiles of image data are selected on the basis of the object-level information (see box 38). For example, they are selected from an object of the same class (or the same object part) as an object/parts which needs to be filled. The tiles can be selected from any of: the source and reference images, other objects of the same class in the source and reference images, and a store of other objects of the same class (as the object being filled).

Figure 5:
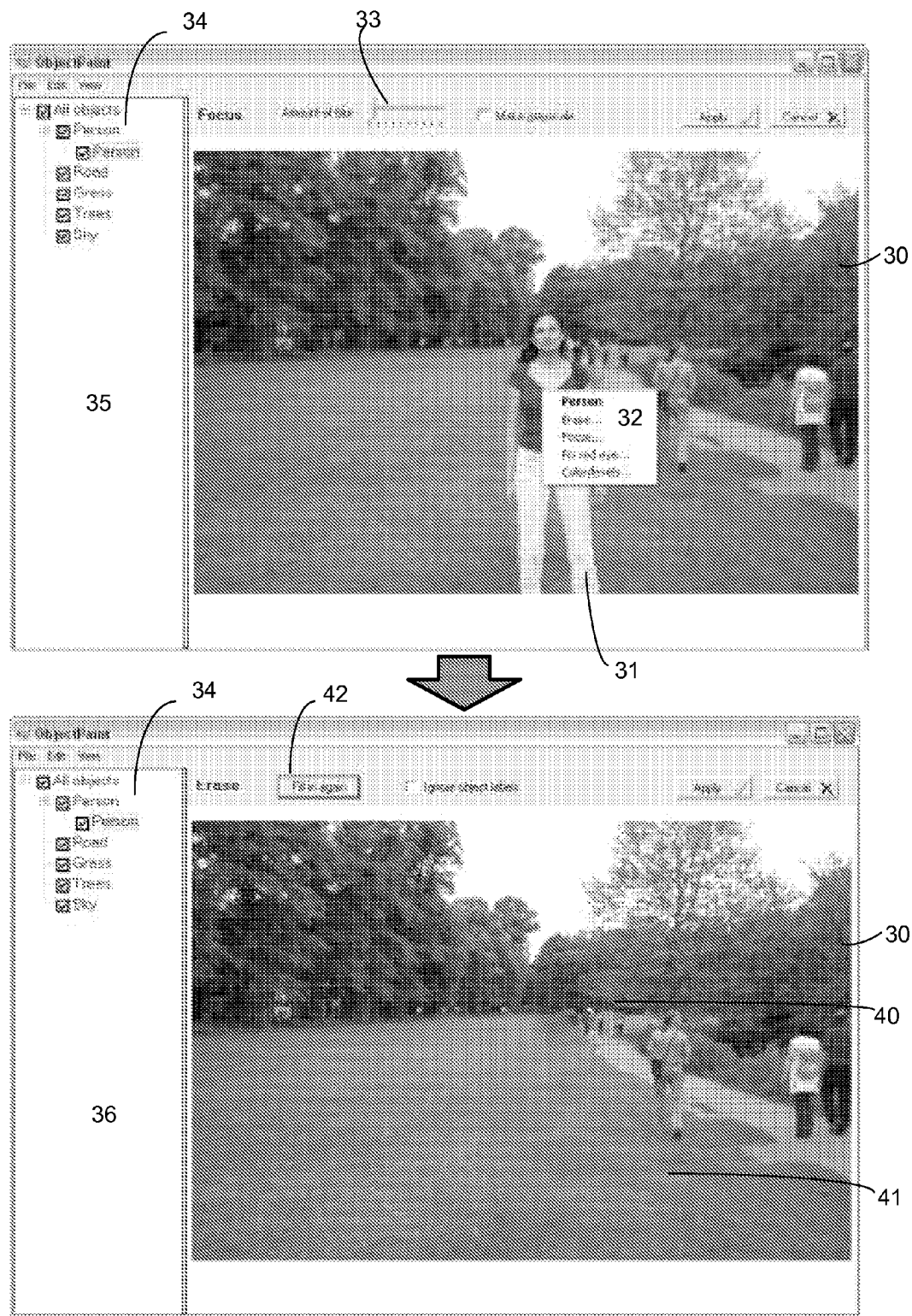
FIG. 5 shows two example user interface displays of an object-level image editing system used for semantic object removal.

In addition, depth ordering information can be used to guide selection of tiles for filling in image regions. For example the selected tiles need only be consistent with objects behind the object to be removed. This is now discussed with reference to the example in FIG. 5. FIG. 5 gives two example user interface displays 35, 36 from our object-level image editing system used for semantic object removal. Display 35 comprises an image of a person 31 standing in a grassed area with a path receding into a background 30 which has trees and sky visible. Each display 35, 36 has graphical user interface devices such as a hierarchical selection structure 34 and an operation bar 33. In the display 35 the operation bar 33 indicates that the focus of the image is being worked on, presents a slider bar 33 to adjust the amount of blur in the image and provides a selection box to make the image greyscale rather than colour for example. Buttons to apply the settings or cancel them are also provided. In the example of display 35 the user has selected the person 31 in any suitable way, such as by placing the mouse pointer over the person 31 and is presented with a menu 32 of available actions including in this example, erase, focus, fix red eye, and colour levels. Suppose the user selects the erase function from menu 32. The image of the person 31 is "semantically" erased giving the result shown in display 36.

In display 36 it can be seen that the background 30 is preserved, the image of the person 31 is omitted and the image region previously taken up by the image of the person 31 is filled in, in a manner appropriate to the rest of the image.

The image region previously taken up by the person is indicated by reference numerals 40 and 41 in FIG. 5. Depth ordering and shape information is used to infer that the region behind the person is to be filled in using "grass like" tiles in region 41 and "tree like" tiles in region 40. Without this depth ordering information it could be that "grass like" tiles are used to fill in the whole region where the image of the person 31 previously was. Also, if there were objects in front of the person being erased, the depth information would allow them to be ignored during the fill in. In addition, segmentation information, segmenting the image into grass, trees, people objects and sky is used to infer which types of tiles to use.
Smart Copy and Paste (and Smart Cut and Paste)

The processes of copying and cutting image regions are preferably identical except that the process of cutting also involves filling in the area of source image from which a region is cut. Preferably the filling in process is carried out intelligently using object-level information.

Figure 6:
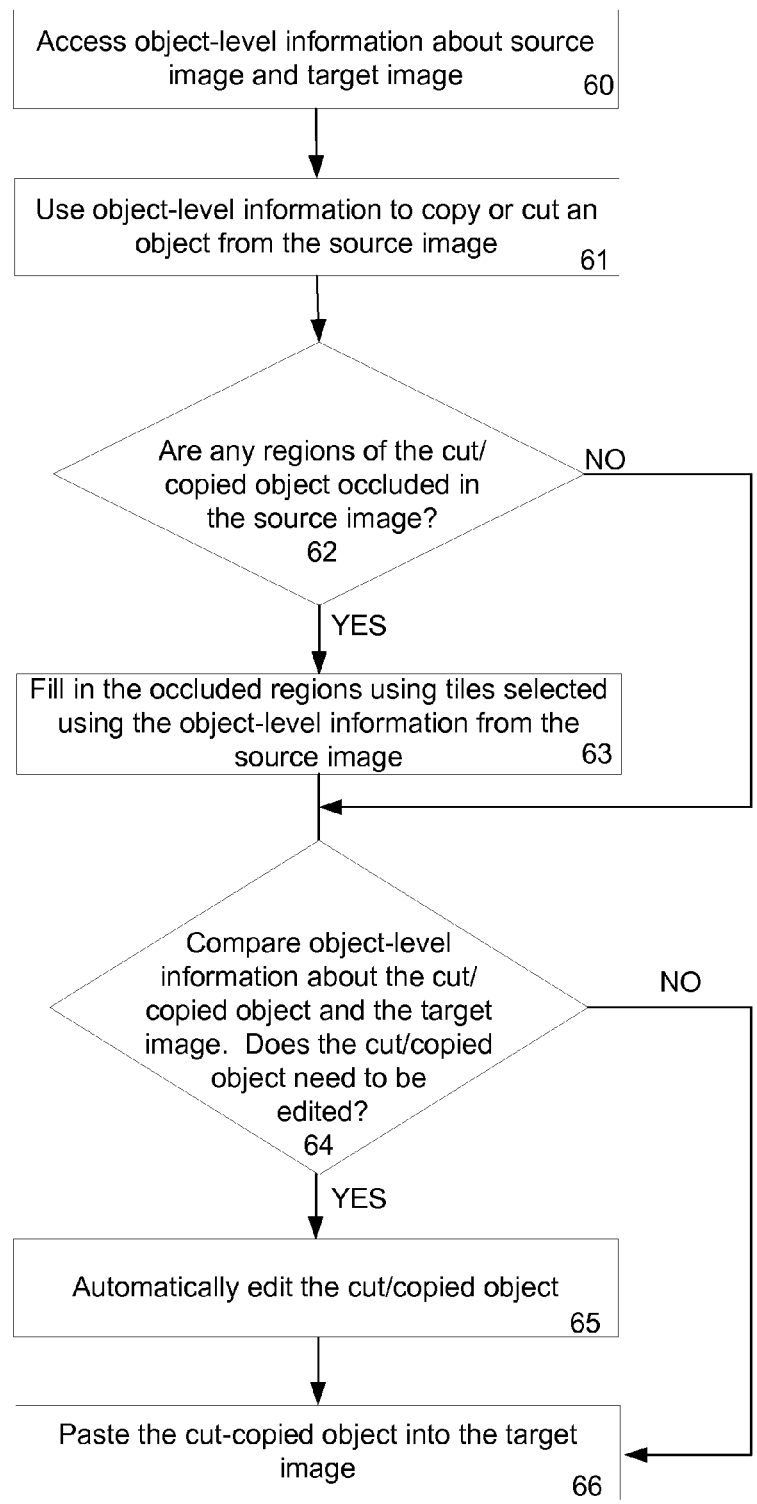
FIG. 6 is a flow diagram of a method of smart copy and paste and smart cut and paste.

FIG. 6 is a flow diagram of a method of using the object-level information for smart copy and paste, or smart cut and paste. Assume that a source image comprises an object to be cut or copied and a reference image which in this case is referred to as a target image is provided to paste the cut/copied object into. The method comprises accessing object-level information about the source and target image as discussed above (see box 60 of FIG. 6). The object-level information is used to copy or cut an object from the source image (see box 61). For example, the segmentation information is used to identify objects and one of these is selected either automatically (for example, using depth ordering information to pick a foreground object, or using pre-specified rules in conjunction with the object class information) or as a result of user input. Once an object is selected, any suitable method of cutting or copying that object is used as known in the art. In the case of cutting, we preferably also fill-in the area of the source image from which a region is cut. This filling in is carried out intelligently using object-level information.

An assessment is then made as to whether there are any regions of the cut/copied object which are occluded in the source image. Depth ordering information and or other object-level information is used to make this assessment. If there are occluded regions, these are filled in (see box 63) using tiles selected using the object-level information from the source image (as discussed above). In addition regions in the source image that are left blank as a result of any cut operation are filled in if required. This is done using tiles selecting using the object-level information.

The next stage comprises comparing the object-level information about both the cut/copied object and the target image and deciding whether the cut/copied object needs to be edited (see box 64). For example, the size of the cut/copied object may need to be altered to correspond to the scale of the objects in the target image. Object class information may comprise information about the relative size of objects of different classes. For example, objects of class building can be specified as larger by a certain factor than objects of class person. Using this information in conjunction with depth ordering information it is possible to automatically determine an appropriate size for the object to be pasted into the target image. In another example, the focus of the object to be pasted may need to be altered to match the focus in the target image. Again, depth ordering information can be used together with information about depth of field information in the target image to decide what focus to apply to the object to be pasted. In another embodiment the colour of the object to be pasted can be altered according to colour details of the target image. Other options include changing the illumination or orientation of the object to be pasted, changing facial expressions in images of people to match those of objects in the target image and others.

If a determination is made to edit the object to be pasted in a particular way that object is automatically edited as required (see box 65) and then pasted into the target image (66). It is noted that any of the steps of the method may be carried out in parallel or in different orders to achieve an equivalent result.

Figure 7A:
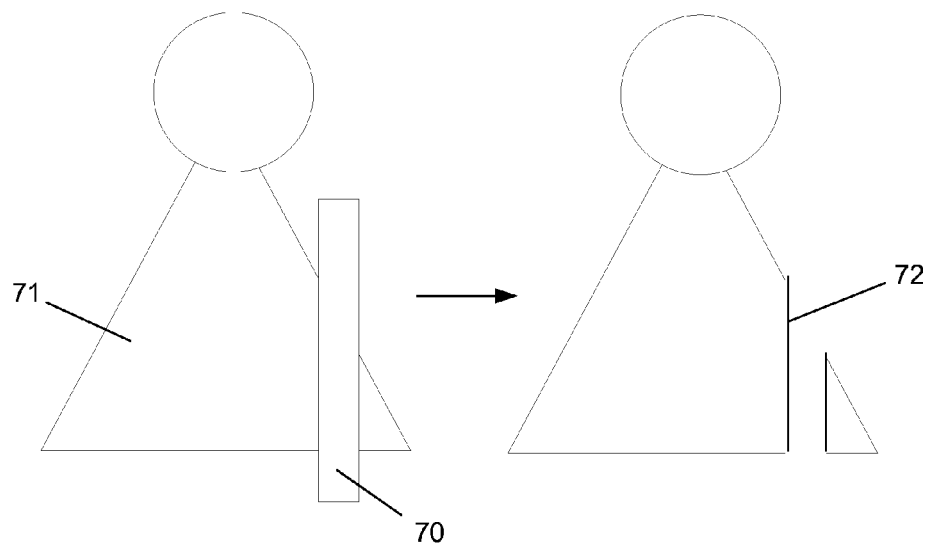
FIG. 7*a* and FIG. 7*b* are schematic diagrams indicating smart copy and paste.
Figure 7B:
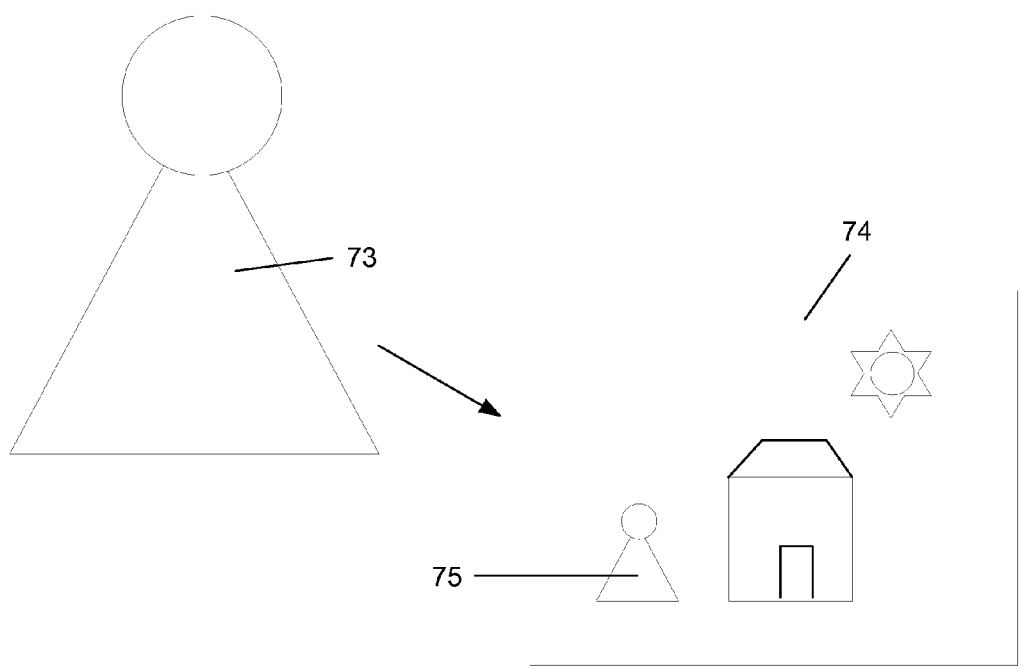

FIGS. 7a and 7b illustrate an example of using smart copy and paste. FIG. 7a schematically shows an image of a person 71 standing behind a post 70. The image of the person is to be copied and pasted into a reference image, referred to in this example as a target image 74 (see FIG. 7b). The result of copying the image of the person is indicated in FIG. 7a and it can be seen that a blank region 72 exists where the post 70 previously occluded part of the image of the person. During the copying process the object-level information about the person is used which provides segmentation for the person and depth ordering information about the post and person.

The occluded region 72 is filled in using tiles to yield a complete image 73 (see FIG. 7b). That complete image 73 is to be pasted into target image 74 which shows a house. Object-level information about the target image indicates that the relative size of a house and a person is such that the complete image 73 needs to be resized. After appropriate re-sizing, and any other determined edits such as refocusing or recolouring the image of the person 75 is pasted into the reference image.

Improved Digital Tapestry

Figure 8:
FIG. 8 is an example of an output image produced using smart digital tapestry.

FIG. 8 is an example of an output image produced from our object-level image editing system after performing improved digital tapestry. The term "digital tapestry" is used herein to refer to using parts of a plurality of source images and blending those parts together to form a single output image. In the example shown in FIG. 8 12 source images were used to form the single digital tapestry output image.

Any suitable method of blending the image parts together can be used. For example, our earlier European Patent application number 05254745.2, filed on 28 Jul. 2005, entitled "Image Blending" describes a suitable method of digital tapestry. Our CVPR conference paper entitled "Digital Tapestry" Carsten Rother, Sanjiv Kumar, Vladimir Kolmogorov, Andrew Blake, 2005, San Diego, USA also describes a suitable method of digital tapestry. In the present application, digital tapestry is improved by enabling selection of image parts from the source image to be guided using the object-level information about the source images. In addition, selection of positions in the output image to place those image parts is guided using the object-level information.

Figure 9:
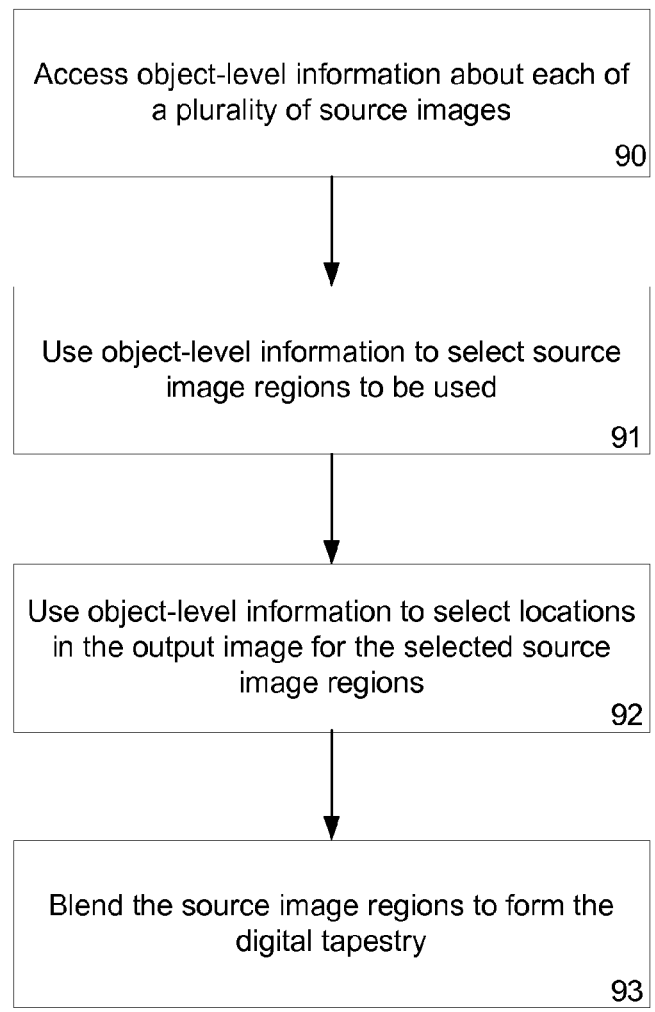
FIG. 9 is a flow diagram of a method of digital tapestry guided using object-level information.

FIG. 9 is a flow diagram of a method of improved digital tapestry or image blending. It comprises accessing object-level information about each of a plurality of source images using the methods described above (see box 90). The object-level information is used to select source image region to be used (see box 91). For example, object class information may be used in conjunction with specified criteria or rules to select pertinent image regions. If there are many images of people for example, it may be specified to select only a threshold number of these for inclusion. Criteria or rules may be specified to prefer some classes of object over others, for example, with grass or roads given lower preference than animals or people. It is also possible to give preference to objects of rare classes of which only one or two for example exist in the source images.

The object-level information may also be used to automatically select locations in the output image for the selected source image regions (see box 92). For example, source image regions may be positioned such that objects of class sky are placed near the top of the output image. The source image regions are then blended to form the digital tapestry as discussed above (see box 93). For example, in FIG. 8 it can be seen that the source image regions containing sky are all positioned so that the sky is at the top of the composite, output image. Also, the images of people are selected such that different people are shown, or where the same person is shown more than once, different poses of that person are given.

Super Resolution Using Object Level Information

Super resolution is the process of making a high resolution image from a low resolution one. Existing super resolution methods ignore the type of object when creating the high resolution image and hence often fill in inappropriate details. An example of existing super resolution methods is given in William T. Freeman, Thouis R. Jones, and Egon C. Pasztor, "Example-based super-resolution", IEEE Computer Graphics and Applications, March/April, 2002.

Figure 10:
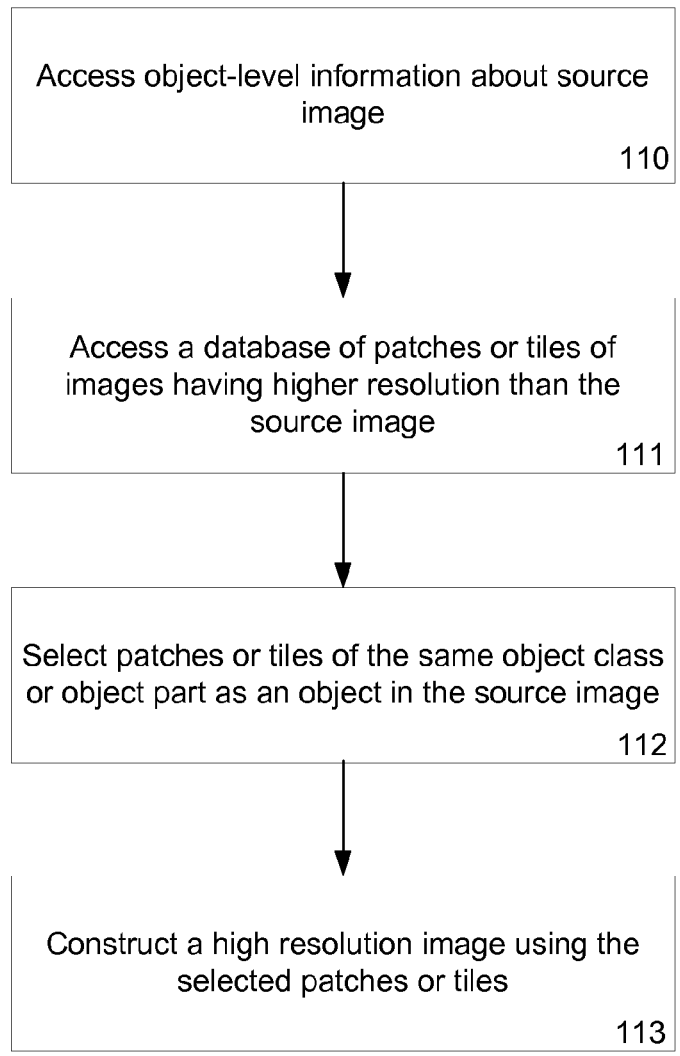
FIG. 10 is a flow diagram of a method of super resolution using object-level information.

FIG. 10 is a flow diagram of a method of using object-level information to improve super resolution. The source image has lower resolution than the output image. Object level information is accessed about the source image (see box 110) as described above. A database of patches or tiles of images having higher resolution than the source image is then accessed (see box 110). The image editing system selects patches or tiles of the same object class or object part as an object in the source image (see box 112) and constructs a high resolution image using the selected patches or tiles (see box 113). The tiles and the method of filling using those tiles may be as described above in the section headed "smart tiling" or any other suitable method may be used.

Auto-Crop Using Object Level Information

A common need in image editing is the ability to crop images to create aesthetically pleasing images in which the proportions of various objects depicted and the relative positions of objects and colours are harmonious and pleasant. It is also required to be able to crop images to meet particular requirements, such as passport photographs, and to illustrate objects or scenes in the most clear and understandable way. Previously artists and graphic designers have manually cropped digital images to achieve these and similar objectives. However, there is a desire to enable non-skilled users to crop images effectively and to provide systems which automatically crop images without the need for human intervention.

Figure 11:
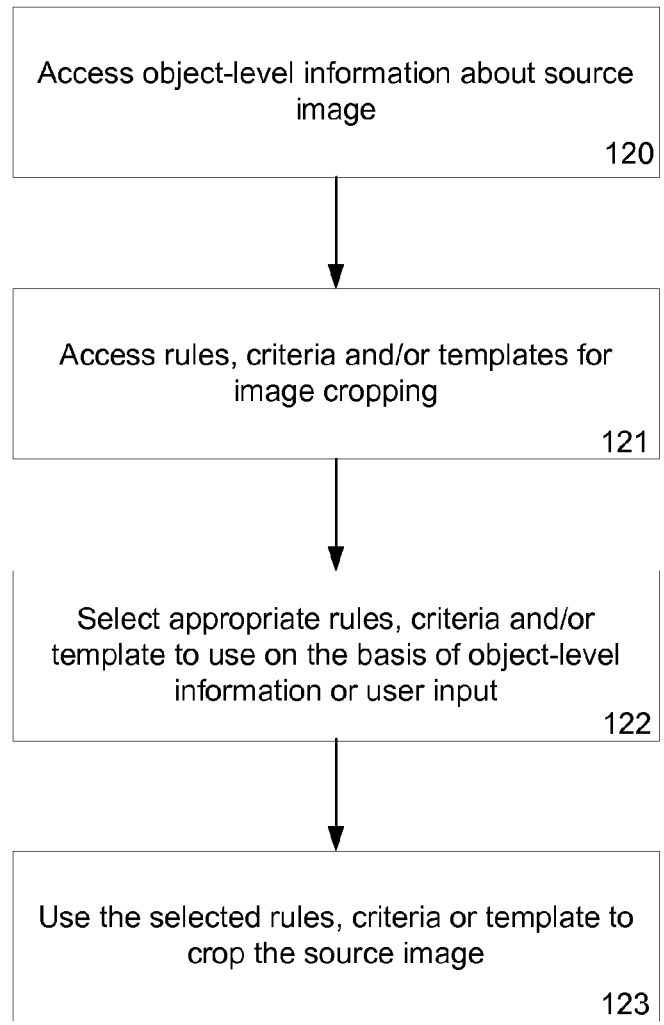
FIG. 11 is a flow diagram of a method of automatically cropping an image using object-level information.

FIG. 11. is a flow diagram of a method of automatically cropping a source image using object-level information. The object level information about the source image is accessed (see box 120) as described above. The image editing system then accesses rules, criteria and/or templates (which may be probabilistic) for image cropping. These rules, criteria and/or templates are pre-specified. For example, they are created on the basis of empirical data about how expert artists and image croppers transform a given digital image into a cropped one. The rules, criteria and/or templates may be associated with particular situations, such as templates for passport photographs, templates for landscape photographs, templates for portrait photographs, rules for images of still life objects, rules for images of moving objects etc. An example of a rule may be to preserve a ratio of 1/3 sky to 2/3 ground in an image of a landscape scene.

Appropriate ones of the rules, criteria and/or templates are then selected (see box 122). This selection can be made on the basis of user input or automatically on the basis of the object level information in the source image. For example, if the object level information indicates that the image comprises a person in the foreground and grass in the background, the portrait photograph template may be selected.

Using the selected rules, criteria or templates the source image is then cropped (see box 123).

Auto-Colour Balance Using Object Level Information

It can often be the case that due to artifacts and other processes, the colour distribution of a given digital image is not realistic, not aesthetically pleasing or inaccurate. In such situations it is known to change the colour distribution either manually or semi-automatically by trial and error. We improve on this by enabling object-level information to be used to guide and improve colour balancing.

Figure 12:
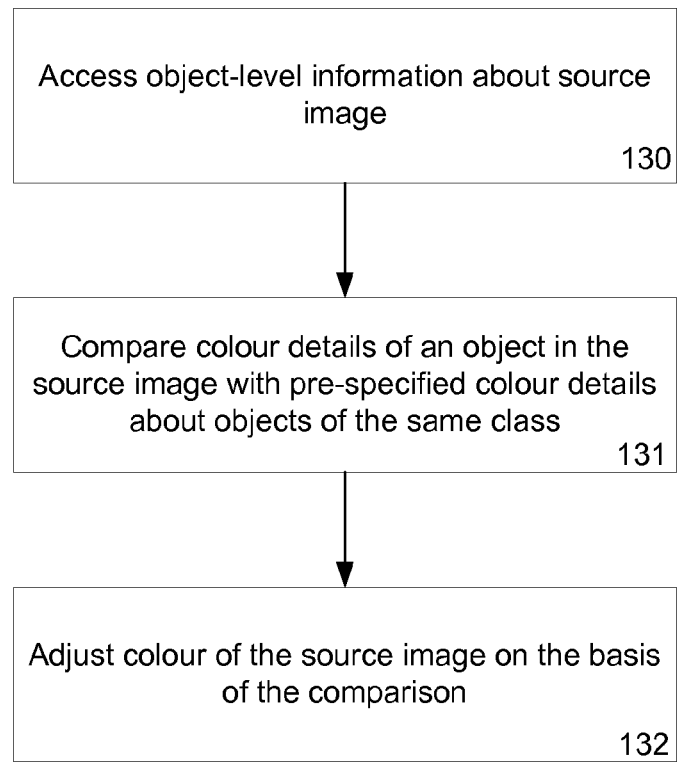
FIG. 12 is a flow diagram of a method of automatically adjusting the colour of a source image using object-level information.

FIG. 12 is a flow diagram of a method of automatically colour balancing an image using object-level information. The object-level information about the source image is accessed (see box 130) as described above. A comparison is then made (see box 131) of the colour details of an object in the source image with pre-specified colour details about objects of the same class (see box 131). For example, suppose an image comprises an object of class grass. The colour distribution of that object in the actual image might be biased towards a particular value which is substantially different from known, pre-specified colour distributions for objects of class grass. The difference between the two colour distributions provides an indication as to how the colour distribution of the whole source image should be adjusted to provide a more realistic and/or pleasing result. The colour details compared can be colour distributions, colour values, particular colour statistics or any other suitable colour information. It is then possible to adjust the colour of the source image on the basis of the comparison (see box 132). The colour of only the object can be changed or of the whole image.

TouchCut

The use of object-level information in the image editing system as described herein is particularly advantageous because it enables single-click (or single user action) object selection. This ability is particularly useful for image editors who typically need to edit given objects in an image separately or independently of the rest of the image. Previously, it has been necessary to manually draw around required objects to select them, using lassoing tools, drawing tools or the like. This is time consuming and requires fine manual dexterity and expertise. The single-click object selection of the present application avoids these problems and is also referred to herein as TouchCut.

Figure 13:
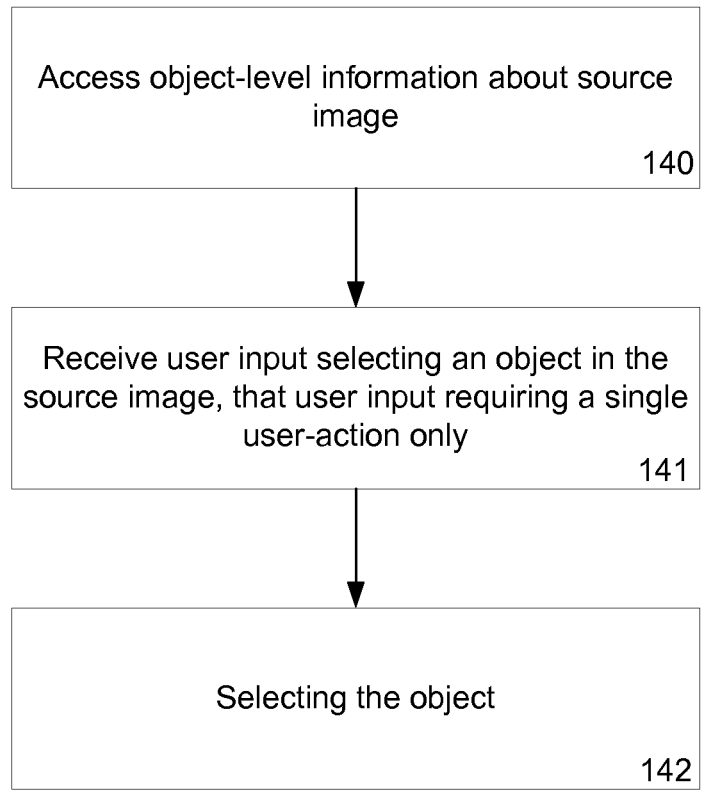
FIG. 13 is a flow diagram of a single user-action method of selecting an object.

FIG. 13. is a flow diagram of such a method. Object-level information is accessed about the source image (see box 140) as described above. The image editing system then receives a user input selecting an object in the source image. This user input can be of any suitable type such as a mouse click, touch screen event, key press, sound or other user input. The user input requires only a single user-action to be made in order to select the object (see box 141). This is a huge improvement over the prior art where objects generally had to be selected by drawing round their borders. The image editing system then selects the object (box 142) and may or may not indicate this via the user interface, for example, by highlighting the selected object, presenting a flashing border around the selected object or in other ways.

Figure 14:
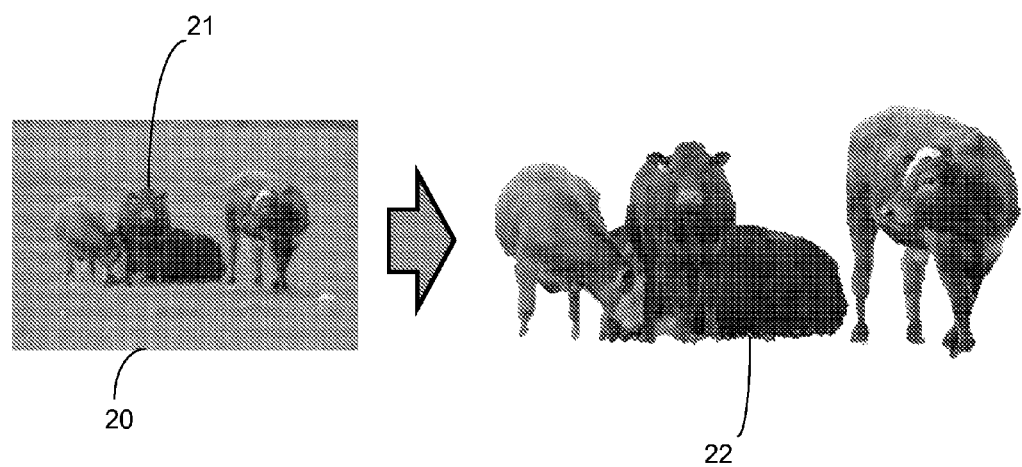
FIG. 14 shows a source image and the results of selecting a foreground object being a group of four cows from the source image using object-level information.

FIG. 14 shows a source image 20 of a group of four cows against a background of grass. TouchCut is used to select the foreground object, being the group of four cows 22. This is achieved with a single mouse click anywhere in the region of the source image 20 comprising the cows.

Once TouchCut is used to select an object that object can be manipulated in any suitable manner, for example to emphasise that object by changing its colour, focus or size, by adding borders to that object, adding shading, changing the depth ordering of the object relative to other objects in the image, or in any other suitable manner. Alternatively, such actions or manipulations can be made to the parts of the source image which are not selected.

A particular embodiment in which the selected object is replaced by another image is now discussed.

SmartReplace

Figure 15:
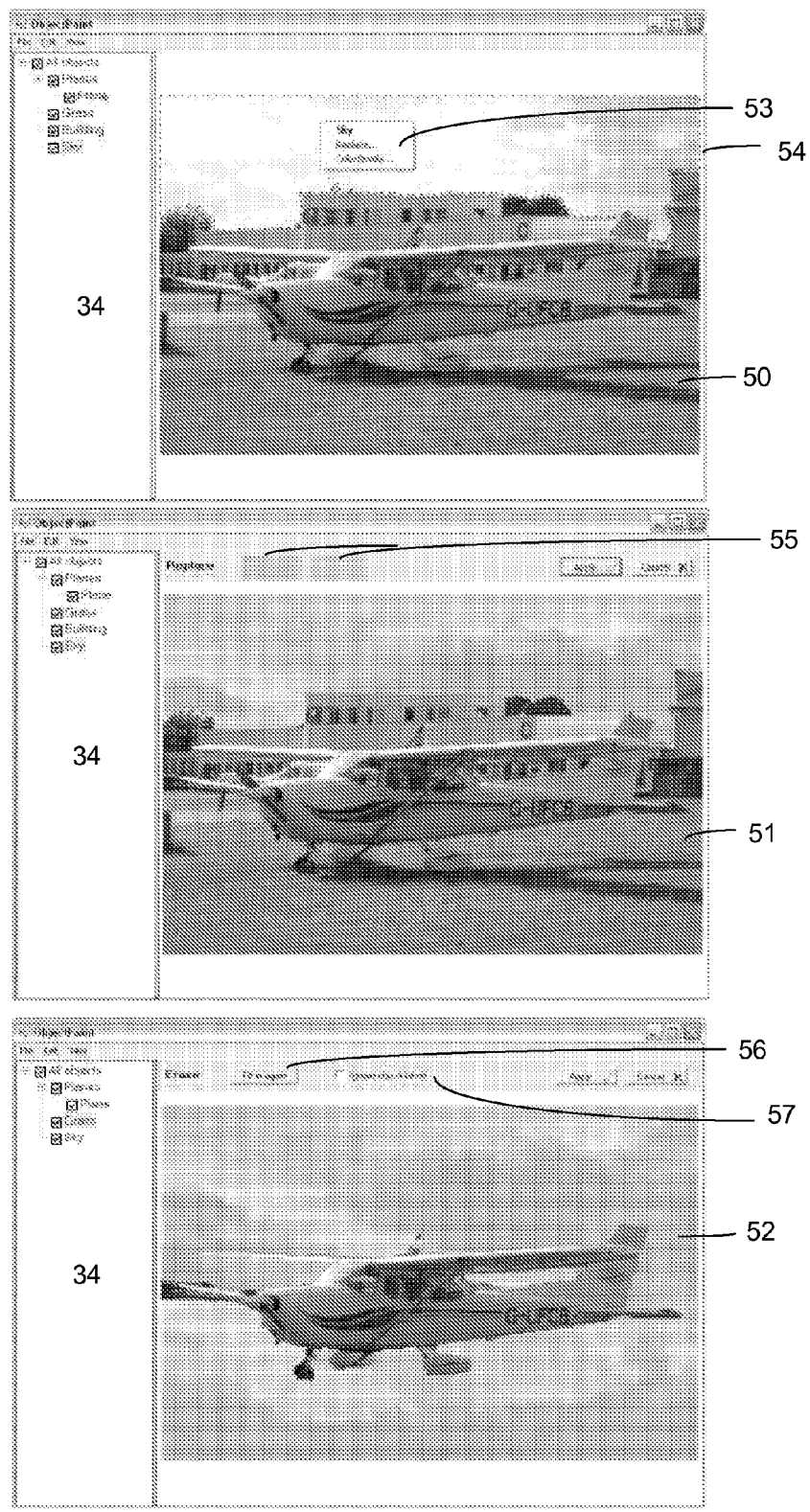
FIG. 15 shows example user interface displays demonstrating object replacement using the image editing system.

FIG. 15 shows example user interface displays of our image editing system where SmartReplace is used. A first user interface display 50 comprises an image of an aeroplane standing on grass in front of a building above which sky is visible. In that first user interface display 50 it can be seen that the sky object 54 has been selected using TouchCut or in any other suitable manner. In this example the selection is indicated by a dotted border around the sky object 54. In addition a menu 53 of possible actions to be performed on the sky object is presented. The menu comprises the options: replace and colour levels in this example.

Suppose that the user selects the replace option; display 51 is then presented. A command bar is presented indicating that the replace function is current and providing two example sky object instances 55 to use to replace the existing sky. The user selects one of these object instances and clicks apply. The sky object of the first display 50 is then replaced by the selected sky object instance as indicated in the second display 51.

Suppose that the user proceeds to erase the building object and the grass object and fill these image regions in with sky; the result is indicated in the third display 52 showing an aeroplane against sky only. Sky has been used to fill in the regions previously occupied by building and grass. In this display the command bar now shows the option to erase the aeroplane object or to fill in again 56 and this can be done whilst ignoring the object labels 57 if required.

Figure 16:
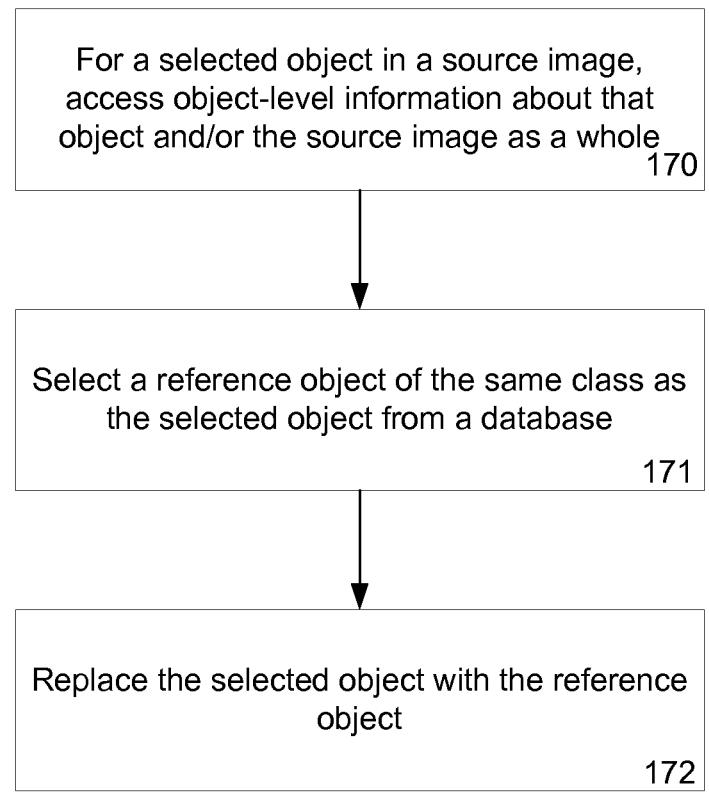
FIG. 16 is a flow diagram of a method of object replacement using object-level information.

Thus SmartReplace involves using object-level information about a selected object to select appropriate material with which to replace the selected object. FIG. 16 is a flow diagram of a method of SmartReplace.

For a selected object in a source image, the image editing system accesses object-level information about that object and/or the source image as a whole (see box 170). A reference object is then selected from a database (see box 171). The reference object is preferably of the same class or a related class to the selected object. For example, clear sky may be replaced by a cloudy sky. Alternatively, an image of a cow which is unclear may be replaced by an image of a horse. The selection may also be made on the basis of object-level information about the source image as a whole. For example, that information might indicate that the source image is a landscape photograph so that object instances inappropriate for inclusion in such a landscape are not selected. The next stage involves replacing the selected object with the reference object (see box 172). This is achieved in any suitable manner as known to the skilled person. In a particular embodiment the smart replace process comprises object synthesis. For example, suppose that it is required to change the image of a particular instance of a person by replacing the hair on that person. In this case the object-level information is used to identify and locate the hair object part of the person image. Tiles are picked from a database such that the tiles are from another instance of a hair object part. Those selected tiles are then used to replace the existing hair in the image. In this way a new object instance of a particular class is created; that new object instance not having been part of the database.

Smart Depth of Field Manipulation

Figure 17:
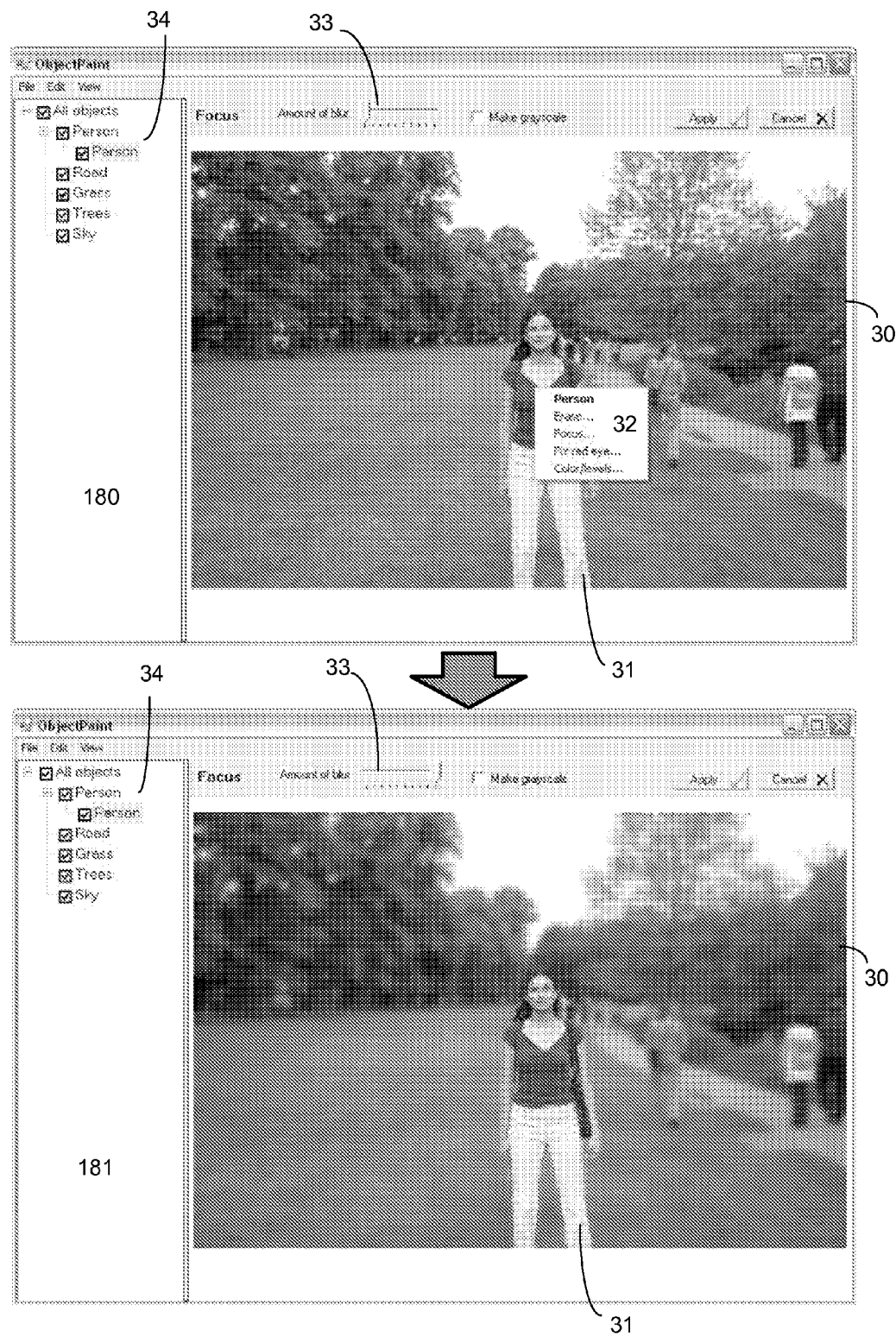
FIG. 17 shows two user interface displays demonstrating depth of field manipulation using object-level information.

The object-level information can also be used for smart depth of field manipulation. For example, FIG. 17 shows two user interface displays 180, 181 from the image editing system. The first user interface display 180 shows a source image of a person 31 standing in the foreground with a grassed area receding into the background. TouchCut or any other suitable method is used to select the person 31 as described above. A menu 32 is presented indicating the actions that are possible with respect to the image of the person 31. These include for example, erase, focus, fix red eye and colour levels. Suppose focus is selected. This is indicated in a command bar in the second user interface display 181. A slider bar for adjusting the level of blur 33 is provided and when the amount of blur is selected to be high the results are shown in display 181. It can be seen that the image of the person 31 is retained in focus whilst blur is applied to the rest of the image. However, this is not essential. The depth of field can be adjusted in any suitable way taking into account the object-level information.

User Interface Improvements

We also improve the user interface of the image editing system using the object-level information. This is achieved by arranging the user interface such that the editing options presented to a user via the interface are selected on the basis of the object-level information associated with the selected object. For example, in FIG. 5 the menu 32 associated with the selected image of a person 31 comprises options suitable for operation on the image of the person. These comprise: erase, focus, fix red eye, colour/levels. In contrast, FIG. 15 shows menu 53 associated with the object, sky. This menu only presents the options of replace and colour/levels. This is because operations such as fix red eye and focus are not appropriate for objects of class sky. In order to achieve this class specific editing options are specified and are accessible to the image editing system. Menu options may depend on attributes of the object class, e.g. is it structured or does it belong to a broader category e.g. vehicles.

Figure 18:
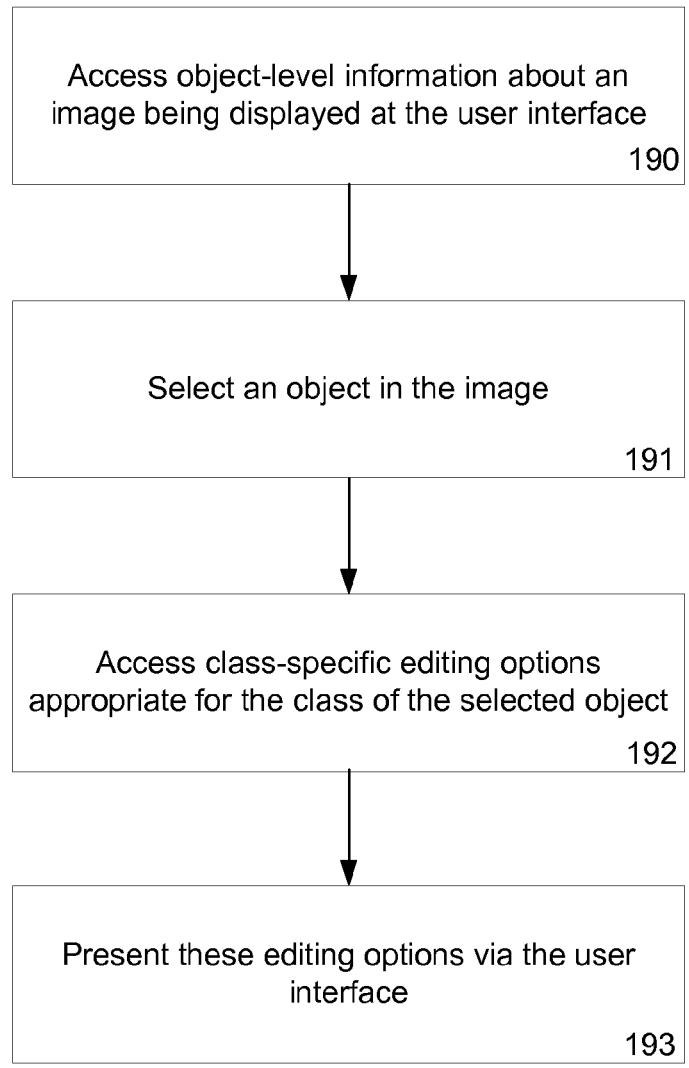
FIG. 18 is a flow diagram of a method of providing a user interface of an image editing system using object level information.

FIG. 18 is a flow diagram of a method of providing a user interface of an image editing system using object level information. Object-level information is accessed about an image being displayed at the user interface (see box 190). An object in the image is then selected (see box 191). For example, this is achieved using a user input or is carried out automatically by the editing system. Class specific editing options are then accessed from a store of specified class specific editing options. Editing options appropriate for the class of the selected object are accessed (see box 192) and presented via the user interface (see box 193).

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

Although the present examples are described and illustrated herein as being implemented in an image editing system for digital still images, the system described is provided as an example and not a limitation. As those skilled in the art will appreciate, the present examples are suitable for application in a variety of different types of image processing systems such as video processing, medical image manipulation systems, virtual reality systems, computer game presentation systems, and editing facilities built into a camera.

The invention claimed is:

1. A method of editing a source digital image comprising:
accessing automatically generated object-level information about the source digital image, the object-level information including:
a segmentation of the source digital image into one or more objects, and
for each of the one or more objects, one or more details of a class that the object is a member of;
receiving a user input to select one of the objects in the source digital image based on the object-level information;
generating replacement material based on the object-level information for the selected object, generating including obtaining replacement material of a first size from a source; and
automatically processing the source digital image based on the selected object and the object-level information, including replacing the selected object with the replacement material to form an output digital image, automatically processing including:
automatically determining, independent of any user size selection, to scale the replacement material based at least in part on relative sizes of two or more of the replacement material, the selected object, and at least another object of the one or more objects; and
automatically scaling the replacement material to match the user-selected object in the source digital image using at least a portion of the automatically generated object-level information, automatically scaling including changing the replacement material from the first size to a second size, the replacement material of the second size being absent from the source.

2. A method as claimed in claim 1 wherein the object-level information includes at least one of: information about a depth ordering of at least some of the one or more objects, one or more object attributes, or information about a position of a part of at least one of the objects.

3. A method as claimed in claim 1 further comprising:
combining at least part of the source digital image with one or more reference digital images to form the output digital image; and
accessing automatically generated object-level information about the one or more reference digital images including:
segmentation of the one or more reference digital images into one or more objects and,
for each of the one or more objects, details of a class that the object is a member of.

4. A method as claimed in claim 1 carried out for a plurality of source digital images to create a single output image and wherein the single output image is formed automatically based on object-level information about each of the plurality of source digital images.

5. A method as claimed in claim 4 further comprising selecting one or more parts of the plurality of source digital images for inclusion in the single output image on the basis of the object-level information.

6. A method as claimed in claim 4 further comprising selecting one or more locations in the single output image to position one or more parts of the plurality of source digital images based on the object-level information.

7. A method as claimed in claim 1 wherein the source digital image has a lower resolution compared to the output digital image.

8. A method as claimed in claim 7 wherein automatically processing the source digital image further comprises accessing a database of images having higher resolution than the source digital image, and selecting one or more images from the database to use in forming the output digital image, based on the object-level information.

9. A method as claimed in claim 1 wherein the output digital image is cropped from the source digital image and wherein automatically processing the source digital image further comprises automatically cropping the source digital image based on the object-level information.

10. A method as claimed in claim 9 further comprising automatically cropping the source digital image based on at least one of a template, a rule, or one or more selected criteria.

11. A method as claimed in claim 1 wherein automatically processing the source digital image further comprises adjusting the color balance of the source digital image on the basis of the object-level information.

12. A method as claimed in claim 1 further comprising presenting an indication to a user via a user interface as to which object in the source digital image is selected as a result of the single user input, the selection having been made by the user with a single action.

13. A method as claimed in claim 12 further comprising arranging the user interface such that editing options presented to a user via the interface are selected on the basis of the object-level information associated with the selected object.

14. A method as claimed in claim 12 further comprising modifying at least one of a color, a focus or a depth order of the selected object.

15. A method as claimed in claim 1 wherein automatically processing the source digital image further comprises replacing an object or part of an object in the source digital image with an image of a selected object or object part from a database and wherein selection of the object or object part is made based on the object-level information.

16. An apparatus comprising:
an interface to:
access automatically generated object-level information about a source digital image, the object-level information including a segmentation of the source digital image into one or more objects and, for each of the one or more objects, one or more details of a class that the object is a member of, and
receive a single input selecting one of the objects in the source digital image based on the object-level information; and
at least one processor to:
determine a replacement object of a related class to the class of the selected object based on the object-level information for the selected object, determining the replacement object including obtaining the replacement object of a first size from a source; and
automatically process the source digital image based on the selected object and the object-level information, including replacing the selected object with the replacement object to form an output digital image, automatically processing including:
automatically determining, independent of any user size selection, to scale the replacement object based at least in part on relative sizes of two or more of the replacement object, the selected object, and at least another object of the one or more objects; and
automatically scaling the replacement object to match the user-selected object in the source digital image using at least a portion of the automatically generated object-level information, automatically scaling including changing the replacement object from the first size to a second size, the replacement material of the second size being absent from the source.

17. An apparatus as claimed in claim 16 wherein the object-level information includes at least one of information about a depth ordering of at least some of the objects, one or more object attributes, and information about a position of a part of at least one of the objects.

18. An apparatus as claimed in claim 16 wherein the processor further operates to combine at least a part of the source digital image with one or more reference digital images to form the output digital image and wherein the interface further operates to access automatically generated object-level information about the one or more reference digital images, the information including a segmentation of the one or more reference digital images into one or more objects and, for each of the objects, one or more details of a class that the object is a member of.

19. One or more computer readable storage media, the one or more computer readable storage media being hardware, storing instructions that, when executed by a processor, enable the processor to perform actions comprising:

accessing automatically generated object-level information associated with a source digital image, the object-level information including a segmentation of the source digital image into one or more objects and, for each of the one or more objects, one or more details of a class that the object is a member of; and automatically processing the source digital image based on the object-level information to form an output digital image, including:

automatically cropping the source digital image based on a single input to select one of the objects in the source digital image;

determining a replacement object of a related class to the class of at least one object that is adjacent to the selected object in the source digital image based on the object-level information, determining including obtaining the replacement object of a first size from a source;

automatically determining, independent of any user size selection, to scale the replacement object based at least in part on relative sizes of two or more of the replacement object, the selected object, and at least another object of the one or more objects;

automatically scaling the replacement object to match the selected object using at least a portion of the automatically generated object-level information, automatically scaling including changing the replacement object from the first size to a second size, the replacement material of the second size being absent from the source; and replacing the selected object with the replacement object to form the output digital image.

20. The one or more computer readable storage media of claim 19, wherein the object-level information includes at least one of: information about a depth ordering of at least some of the one or more objects, one or more object attributes, and information about a position of one or more object parts.

\* \* \* \* \*